(12) United States Patent
Tatsumi

(10) Patent No.: US 10,958,355 B2
(45) Date of Patent: Mar. 23, 2021

(54) OPTICAL RECEIVER CIRCUIT

(71) Applicant: SUMITOMO ELECTRIC INDUSTRIES, LTD., Osaka (JP)

(72) Inventor: Taizo Tatsumi, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/675,416

(22) Filed: Nov. 6, 2019

(65) Prior Publication Data

US 2020/0145114 A1    May 7, 2020

(30) Foreign Application Priority Data

Nov. 7, 2018  (JP) .............................. JP2018-209555

(51) Int. Cl.
*H04B 10/69*    (2013.01)
(52) U.S. Cl.
CPC ..... *H04B 10/6931* (2013.01); *H04B 10/6911* (2013.01)
(58) Field of Classification Search
CPC ........ H03F 1/086; H03F 1/3211; H03F 1/342; H03F 2200/339; H03F 2203/45528; H03F 3/082; H03F 3/45179; H04B 10/2504; H04B 10/541; H04B 10/6931; H04B 10/693; H04B 10/697; H04B 10/6911; H04Q 11/0005; H04Q 2011/0039; H04Q 2011/0041
USPC .................................................. 398/208–214
See application file for complete search history.

(56) References Cited

U.S. PATENT DOCUMENTS

| | | | |
|---|---|---|---|
| 4,574,249 A | 3/1986 | Williams | |
| 5,347,389 A * | 9/1994 | Skrobko | H03F 1/22 |
| | | | 250/214 A |
| 5,760,939 A * | 6/1998 | Nagarajan | B82Y 20/00 |
| | | | 372/34 |

(Continued)

FOREIGN PATENT DOCUMENTS

JP    2013-251589    12/2013

OTHER PUBLICATIONS

Baharmast et al ;A wide Dynamic range laser radar receiver based on Input pulse-shaping techniques; IEEE, Aug. 2020; pp. 2566-2577 (Year: 2020).*

*Primary Examiner* — Amritbir K Sandhu
(74) *Attorney, Agent, or Firm* — Smith, Gambrell & Russell, LLP.

(57) ABSTRACT

An optical receiver circuit includes an input terminal receiving current signal from photodetector; a trans-impedance amplifier converting the current signal into voltage signal; an inductor having one end connected to the input terminal and another end connected to the input of the trans-impedance amplifier; a first variable resistor having a first end connected to the other end of the inductor, a second end receiving bias voltage, and a third end receiving a control signal, where the first variable resistor varies a resistance between the first end and the second end in accordance with the control signal; and a second variable resistor having a first end connected to the one end of the inductor, a second end receiving bias voltage, and a third end receiving a control signal, where the second variable resistor varies a resistance between the first end and the second end in accordance with the control signal.

9 Claims, 18 Drawing Sheets

(56) References Cited

U.S. PATENT DOCUMENTS

| | | | | |
|---|---|---|---|---|
| 6,639,473 B1* | 10/2003 | Kobayashi | | H03F 3/08 |
| | | | | 250/214 A |
| 6,933,786 B1* | 8/2005 | Mohandas | | H03F 1/56 |
| | | | | 250/214 A |
| 6,956,439 B1* | 10/2005 | Devnath | | H03F 1/26 |
| | | | | 330/259 |
| 8,059,973 B2* | 11/2011 | Douma | | G02B 6/4246 |
| | | | | 398/209 |
| 8,741,639 B2* | 6/2014 | Yonemitsu | | C12N 5/0639 |
| | | | | 435/372 |
| 9,148,231 B2* | 9/2015 | Morita | | H04B 10/6973 |
| 9,490,757 B2* | 11/2016 | Frank | | H03F 3/45183 |
| 9,774,305 B1* | 9/2017 | Broekaert | | H03F 3/082 |
| 10,291,330 B2* | 5/2019 | Yuda | | H04B 10/40 |
| 10,326,416 B2* | 6/2019 | Sugimoto | | H03F 3/45475 |
| 2003/0201381 A1* | 10/2003 | Baumgartner | | H03F 3/087 |
| | | | | 250/214 A |
| 2005/0062540 A1* | 3/2005 | Nakatani | | H03F 3/19 |
| | | | | 330/294 |
| 2006/0034622 A1* | 2/2006 | Day | | H03F 3/087 |
| | | | | 398/208 |
| 2006/0067710 A1* | 3/2006 | Liu | | H04B 10/6932 |
| | | | | 398/202 |
| 2007/0229172 A1 | 10/2007 | Tatsumi et al. | | |
| 2008/0179496 A1* | 7/2008 | Sakura | | H03F 3/08 |
| | | | | 250/214 A |
| 2011/0110672 A1* | 5/2011 | Blauvelt | | H04B 10/693 |
| | | | | 398/202 |
| 2012/0070121 A1* | 3/2012 | Ito | | H03F 3/087 |
| | | | | 385/88 |
| 2013/0071128 A1* | 3/2013 | Walter | | B82Y 20/00 |
| | | | | 398/141 |
| 2014/0016949 A1* | 1/2014 | Koizumi | | H04B 10/60 |
| | | | | 398/212 |
| 2014/0363169 A1* | 12/2014 | Conger | | H04B 10/693 |
| | | | | 398/115 |
| 2015/0086221 A1* | 3/2015 | Shringarpure | | H03F 3/45475 |
| | | | | 398/208 |
| 2016/0268981 A1* | 9/2016 | Jiang | | H03F 3/087 |
| 2017/0104537 A1* | 4/2017 | Radice | | H03F 3/45475 |
| 2019/0190466 A1* | 6/2019 | Lee | | H03G 3/3084 |
| 2020/0036344 A1* | 1/2020 | Nakano | | H03F 1/083 |
| 2020/0052796 A1* | 2/2020 | Kim | | H03K 5/13 |

\* cited by examiner

OPTICAL RECEIVER CIRCUIT

TECHNICAL FIELD

An aspect of the present disclosure relates to an optical receiver circuit for optical communication.

BACKGROUND

Optical receiver modules used in optical communication systems include a photosensor PD (photo-detector), for example, an avalanche photodiode (APD) converting an optical signal subjected to intensity modulation into a current signal (photo-current), and a preamplifier circuit generating a voltage signal based on the current signal (refer to Patent Literature 1: Unexamined Patent Publication No. US 2007/0229172, Patent Literature 2: U.S. Pat. No. 4,574,249, Patent Literature 3: Unexamined Patent Publication No. JP 2013-251589, and Patent Literature 4: U.S. Pat. No. 9,774,305). Recently, a high modulation speed within a range of 28 Gbaud to 64 Gbaud has been required in accordance with increasing demand for communication capacity in an optical communication system. In addition to a non-return-to-zero (NRZ) mode in the related art, a modulation method requiring reception of multi-value signals of pulse amplitude modulation-4 (PAM-4) and the like is also used. Therefore, a linear amplification operation is required for preamplifier circuits. On the other hand, the intensity of an optical signal input to an optical receiver module depends on the optical output power of an optical transmitter and loss values of optical fibers connecting the optical transmitter and an optical receiver. Therefore, for example, optical receiver modules are required to receive an optical signal within a wide dynamic range from a small intensity due to long distance transmission of an input optical signal to a large intensity due to short distance transmission.

The foregoing preamplifier circuits disclosed in Patent Literature 1 and Patent Literature 2 include a gain variable circuit as an element for realizing a linear amplification operation within a wide dynamic range. In addition, in order to receive multi-value signals such as PAM-4 signals in a favorable waveform, flatness of frequency characteristics is also important. For example, an optical receiver module is required to have comparatively flat frequency characteristics up to around 50 GHz at a modulation speed of 64 Gbaud. In response to such a demand, a configuration in which a high-frequency gain in the frequency characteristics is raised by providing an inductance between a photosensor and an input of a preamplifier circuit is also employed. According to this configuration, it is possible to raise a frequency band of −3 dB of high-frequency characteristics of the photosensor and the preamplifier circuit. In preamplifier circuits in the related art, when the intensity of an optical signal is comparatively high, it is desired that the flatness of frequency characteristics of an optical receiver module be improved and output characteristics of a receiver module be ameliorated.

SUMMARY

According to an aspect of the present disclosure, there is provided an optical receiver circuit including an input terminal receiving a current signal from an external photodetector; a trans-impedance amplifier configured to convert the current signal received through an input into a voltage signal; an inductor having one end electrically connected to the input terminal and another end electrically connected to the input of the trans-impedance amplifier; a first variable resistor having a first end electrically connected to the other end of the inductor, a second end receiving an applied bias voltage, and a third end receiving a first control signal, here, the first variable resistor is configured to vary a first resistance value between the first end and the second end in accordance with the first control signal; and a second variable resistor having a first end electrically connected to the one end of the inductor, a second end receiving an applied bias voltage, and a third end receiving a second control signal, here, the second variable resistor is configured to vary a second resistance value between the first end of the second variable resistor and the second end of the second variable resistor in accordance with the second control signal.

DETAILED DESCRIPTION

Hereinafter, an embodiment of the present disclosure will be described with reference to the drawings. In description of the drawings, the same reference signs are applied to the same elements, and duplicate description will be omitted.

Figure 1:
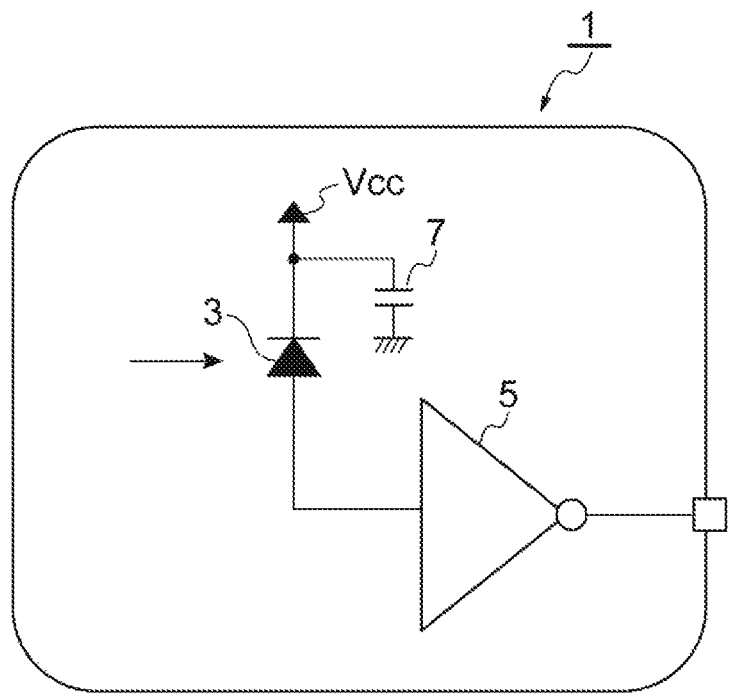
FIG. 1 is a view illustrating a schematic configuration of an optical receiver module according to an embodiment.

FIG. 1 is a view illustrating a schematic configuration of an optical receiver module 1 according to the embodiment. The optical receiver module 1 illustrated in FIG. 1 is a device used in an optical communication system and generates an electrical signal based on an optical signal input via an optical transmission line (optical waveguide) such as an optical fiber. The optical receiver module 1 is configured to include a photosensor (PD: photo-detector) 3 such as an APD and an optical receiver circuit (preamplifier circuit) 5. The photosensor 3 receives an optical signal subjected to intensity modulation and generates a current signal (photocurrent) corresponding to the intensity thereof. In an example in which the photosensor 3 is constituted of a photodiode, a cathode thereof is connected to a bias power supply Vcc and is connected to the ground via a capacitor 7, and an anode thereof is connected to an input of the optical receiver circuit 5. The optical receiver circuit 5 generates and outputs a voltage signal based on a current signal output from the photosensor 3. This current signal is generated in accordance with the intensity of an optical signal. Therefore, when the intensity of an optical signal is small (weak), the current signal has a relatively small value, and when the intensity of an optical signal is high (strong), the current signal has a relatively large value. Therefore, a current signal also has a dynamic range corresponding to the dynamic range of the intensity of an optical signal. When a direction in which a current signal flows into the optical receiver circuit is positive, the current signal always has a positive value. That is, in an ordinary operation, no current flows from the anode toward the cathode of a photodiode.

Figure 2:
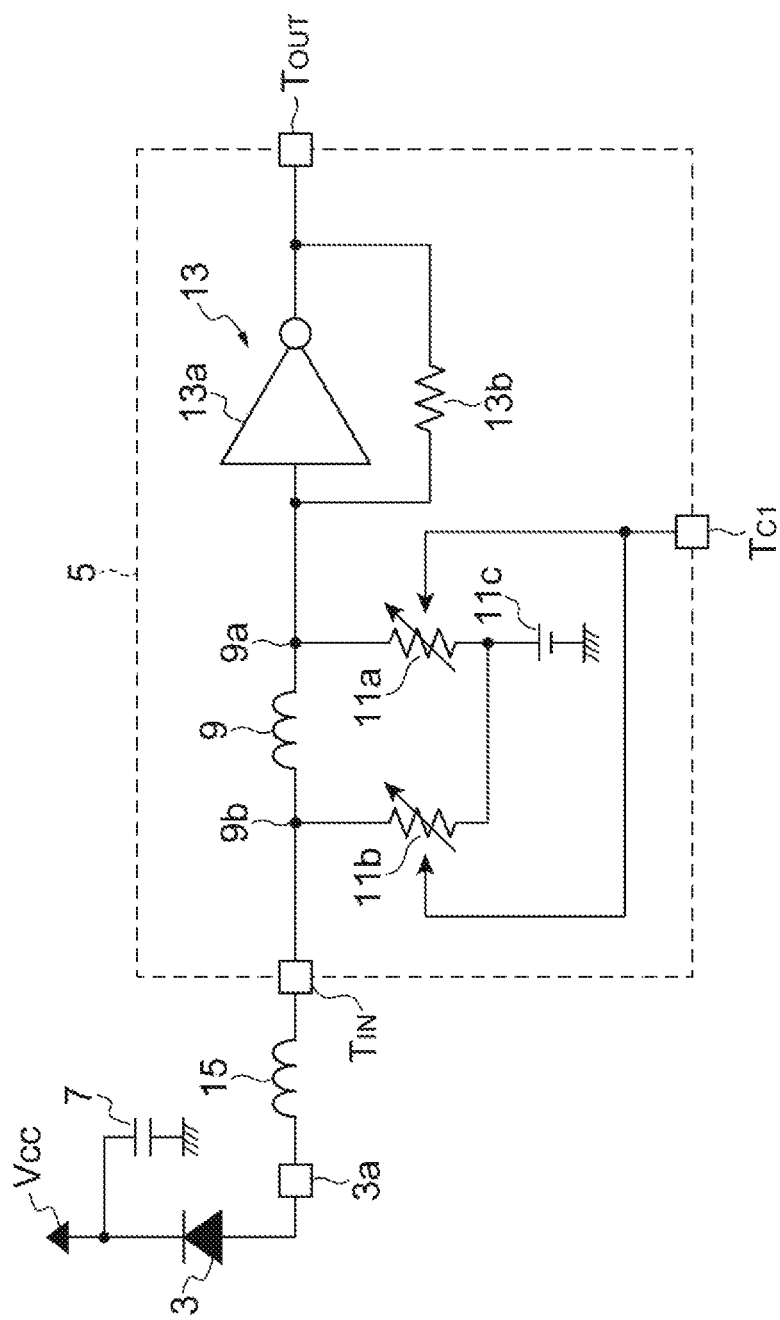
FIG. 2 is a circuit diagram illustrating a detailed configuration of an optical receiver circuit 5 in FIG. 1.

FIG. 2 is a circuit diagram illustrating a configuration of the optical receiver circuit 5. The optical receiver circuit 5 is configured to include an inductor 9, variable resistors 11a and 11b, and a trans-impedance amplifier 13. In addition, the optical receiver circuit 5 has an input terminal $T_{IN}$, an output terminal $T_{OUT}$, and a control terminal $T_{C1}$. This input terminal $T_{IN}$ is electrically connected to an anode terminal 3a of the photosensor 3 via a wire (bonding wire) 15 including a parasitic inductor $L_1$. The input terminal $T_{IN}$ may be subjected to flip-chip connection with the photosensor 3 via the anode terminal 3a and a connection wiring 15 including the parasitic inductor $L_1$. For example, the photosensor 3 and the optical receiver circuit 5 may be individually subjected to flip-chip mounting on a printed board, and they may be electrically connected to each other via a wiring on the printed board (which will hereinafter be simply referred to as "a board").

The inductor 9 is an inductor element having an inductance $L_2$ disposed on the same board as the trans-impedance amplifier 13, and the inductor 9 is formed of a wiring on the board. One terminal 9b of the inductor 9 is electrically connected to the input terminal $T_{IN}$, and the other terminal 9a of the inductor 9 is electrically connected to an input of the trans-impedance amplifier 13. The inductor 9 corresponds to an inductance component of a wiring electrically connecting the input terminal $T_{IN}$ and the input of the trans-impedance amplifier 13 to each other.

The trans-impedance amplifier 13 includes an inverting amplifier (amplifier) 13a and a feedback resistor 13b. An output of the inverting amplifier 13a is electrically connected to the output terminal $T_{OUT}$, and the feedback resistor 13b electrically connects between an input and the output of the inverting amplifier 13a. The trans-impedance amplifier 13 having such a configuration converts a current signal input from the photosensor 3 via the inductor 9 into a voltage signal and outputs the voltage signal from the output terminal $T_{OUT}$. A value obtained by dividing the amplitude of the voltage signal (output signal) by the amplitude of the current signal (input signal) becomes a gain of the trans-impedance amplifier 13. However, it has dimensions of resistance and is referred to as a trans-impedance. The trans-impedance is mainly determined in accordance with the value of the feedback resistor 13b.

The variable resistors 11a and 11b are elements for variably setting a resistance value in accordance with a control voltage applied from the outside via the control terminal $T_{C1}$. A first end of a variable resistor 11a is electrically connected to the other terminal 9a of the inductor 9, and a bias voltage Vref is applied to a second end of the variable resistor 11a from a bias generation circuit 11c. In addition, a first end of a variable resistor 11b is electrically connected to the one terminal 9b of the inductor 9, and the bias voltage Vref is applied to a second end of the variable resistor 11b from the bias generation circuit 11c. Moreover, the same control voltages are applied to a third end of the variable resistor 11a and a third end of the variable resistor 11b from the outside. That is, the present embodiment has a configuration in which the same control voltages are applied to the two variable resistors 11a and 11b such that the resistance value between the first end and the second end in each of the variable resistors 11a and 11b varies to be set in association with each other. Specifically, a resistance value $R_2$ of the variable resistor 11b is set to a value larger than a resistance value $R_1$ of the variable resistor 11a in association therewith. In the present embodiment, for example, a relationship $R_2=2.5 \times R_1$ is set. In the present embodiment, the same bias voltages Vref are applied to the two variable resistors 11a and 11b, but different bias voltages may be applied to the two variable resistors 11a and 11b.

For example, when the trans-impedance amplifier 13, the variable resistors 11a and 11b, and the bias generation circuit 11c are formed on the same semiconductor chip, there are cases where one end of the variable resistor 11b is electrically connected to the one terminal 9b of the inductor 9 via a bonding wire. Since the inductance and the impedance of such a bonding wire are smaller than the resistance value of the variable resistor 11b, they are disregarded herein.

Incidentally, in description of the present embodiment, an "electrically connected" state indicates that, for example, although two nodes within a circuit are not physically and directly connected to each other through a wiring, a signal can be propagated between the two nodes through another wiring. For example, when the input terminal $T_{IN}$ is physically connected to the one terminal 9b of the inductor 9 through a wiring and the one end of the variable resistor 11b is physically connected to the one terminal 9b of the inductor 9 through a wiring, the input terminal $T_{IN}$ and the one end of the variable resistor 11b are in an electrically connected state. Therefore, as long as three circuit elements are electrically connected to each other in such a state, the input terminal $T_{IN}$ and the one end of the variable resistor 11b do not have to be physically and directly connected to each other through a wiring.

Figure 3B:
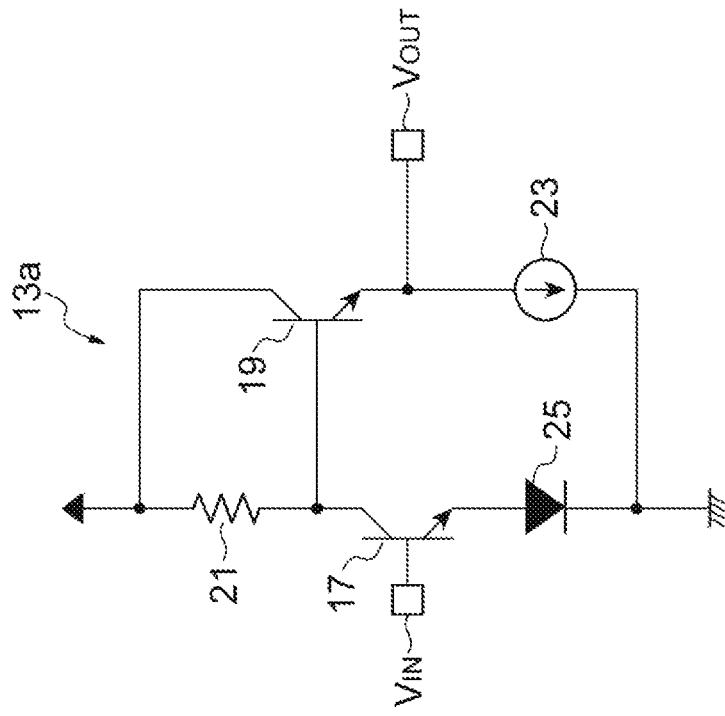
FIG. 3B is a circuit diagram illustrating another example of a configuration of the inverting amplifier 13a in FIG. 2.
Figure 3A:
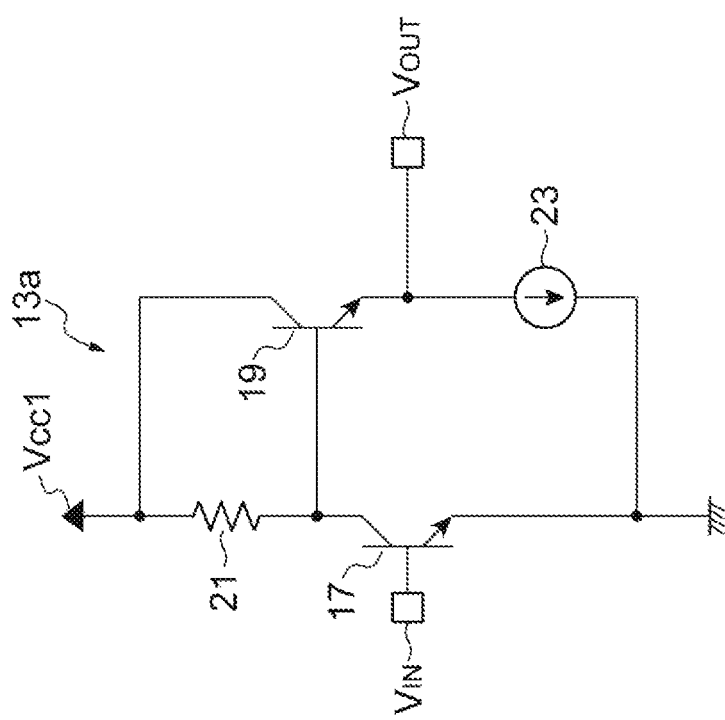
FIG. 3A is a circuit diagram illustrating an example of a configuration of an inverting amplifier 13a in FIG. 2.

FIGS. 3A and 3B are circuit diagrams illustrating examples of a configuration of the inverting amplifier 13a. The inverting amplifier 13a illustrated in FIG. 3A includes two bipolar transistors 17 and 19, a resistance element 21, and a current source 23. In the bipolar transistor 17, a base thereof is connected to an input terminal $V_{IN}$, a collector thereof is connected to a bias power supply Vcc1 via the resistance element 21, and an emitter thereof is connected to the ground. In the bipolar transistor 19, a base thereof is connected to the collector of the bipolar transistor 17, a collector thereof is connected to the bias power supply Vcc1, and an emitter thereof is connected to an output terminal $V_{OUT}$ and is connected to the ground via the current source 23. The bipolar transistor 19 and the current source 23 constitute an emitter follower circuit. In contrast to the configuration illustrated in FIG. 3A, a diode 25 connected to a part between the emitter of the bipolar transistor 17 and the ground such that a current flows from a high potential side to a low potential side in a forward direction is added to the inverting amplifier 13a illustrated in FIG. 3B.

In the inverting amplifier 13a illustrated in FIG. 3A, the DC potentials in the input terminal $V_{IN}$ and the output terminal $V_{OUT}$ are set to approximately 0.9 V. In the inverting amplifier 13a illustrated in FIG. 3B, the DC potentials in the input terminal $V_{IN}$ and the output terminal $V_{OUT}$ are set to approximately 1.7 V. Thus, in accordance with the characteristics of the photosensor 3, a suitable configuration of the configurations illustrated in FIGS. 3A and 3B is selected. The DC potential of the inverting amplifier 13a illustrated in FIG. 3B can be adjusted in accordance with the current-voltage characteristics of the diode 25, for example. This DC potential is also referred to as a bias voltage based on a ground potential.

Figure 4B:
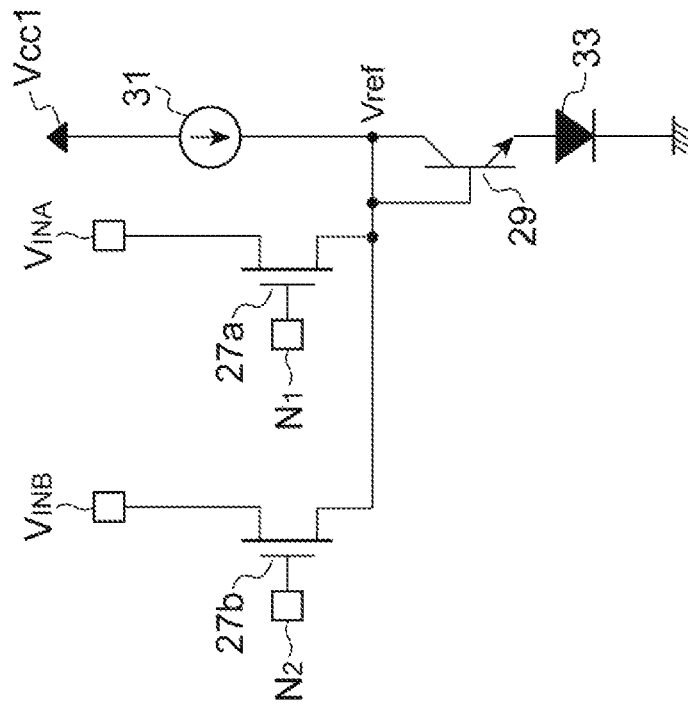
FIG. 4B is a circuit diagram illustrating another example of a configuration of the variable resistors 11a and 11b and the bias generation circuit 11c in FIG. 2.
Figure 4A:
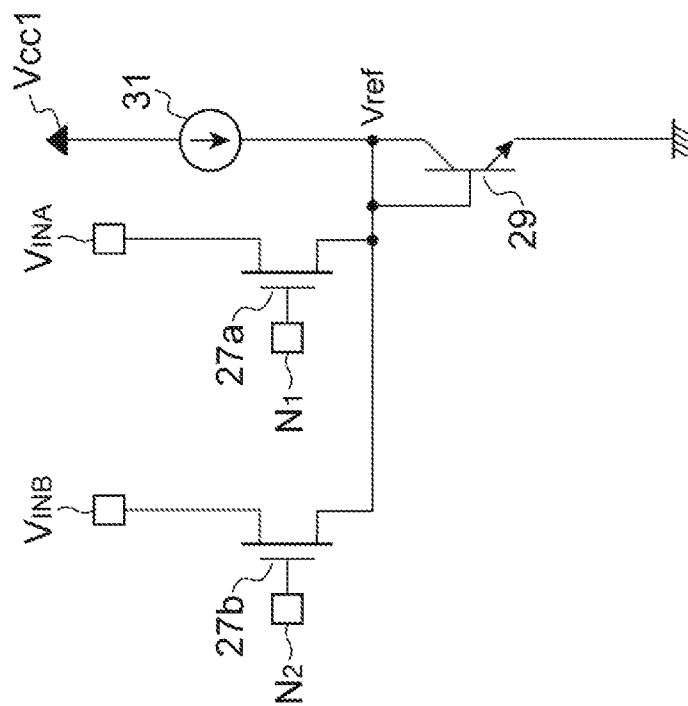
FIG. 4A is a circuit diagram illustrating an example of a configuration of variable resistors 11a and 11b and a bias generation circuit 11c in FIG. 2.

In addition, FIGS. 4A and 4B are circuit diagrams illustrating examples of a configuration of the variable resistors 11a and 11b and the bias generation circuit 11c. FIG. 4A illustrates a configuration of the variable resistors 11a and 11b and the bias generation circuit 11c when the inverting amplifier 13a has the configuration illustrated in FIG. 3A, and FIG. 4B illustrates a configuration of the variable resistors 11a and 11b and the bias generation circuit 11c when the inverting amplifier 13a has the configuration illustrated in FIG. 3B.

In the example illustrated in FIG. 4A, the variable resistors 11a and 11b are constituted of field effect transistors (FET) 27a and 27b respectively, and the bias generation circuit 11c is constituted of a bipolar transistor 29 and a current source 31. In the FET 27a, a drain thereof is connected to the other terminal 9a of the inductor via an input terminal $V_{INA}$, and a control voltage is applied to a gate thereof via a control terminal $N_1$. In the FET 27b, a drain thereof is connected to the one terminal 9b of the inductor via an input terminal $V_{INB}$, and a control voltage is applied to a gate thereof via a control terminal $N_2$. The current source 31 is connected to a base and a collector of the bipolar transistor 29, to which sources of the FETs 27a and 27b are connected. An emitter of the bipolar transistor 29 is connected to the ground.

In such a configuration, the bias voltages Vref applied to the sources of the FETs 27a and 27b are set to have the same potential as that of the DC voltage of the inverting amplifier 13a described above. Therefore, drain-source potentials of the FETs 27a and 27b become substantially 0 V, and each of the FETs 27a and 27b functions as a variable resistor controlled such that the drain-source resistance value varies due to the control voltages applied to the control terminals $N_1$ and $N_2$.

In the example illustrated in FIG. 4A, in contrast to the configuration illustrated in FIG. 4B, a diode 33 connected to a part between the emitter of the bipolar transistor 29 and the ground in the forward direction is added. In such a configuration as well, corresponding to the inverting amplifier 13a having the configuration illustrated in FIG. 3B, the drain-source potentials of the FETs 27a and 27b are adjusted to be substantially 0 V, and therefore each of the FETs 27a and 27b functions as a variable resistor controlled due to the control voltages applied to the control terminals $N_1$ and $N_2$.

According to the optical receiver circuit 5 described above, peaking (lifting action of a gain) in high-frequency characteristics of trans-impedance is applied due to the inductor 9 provided between the input terminal $T_{IN}$ and the input of the trans-impedance amplifier 13, so that the frequency characteristics of trans-impedance can be flattened. Furthermore, the variable resistor 11a is connected to the other terminal 9a of the inductor 9 and the variable resistor 11b is connected to the one terminal 9b of the inductor 9. Therefore, in the dynamic range of the intensity of an input optical signal, an effect of peaking due to the inductor 9 can be stabilized. Accordingly, in the dynamic range of an input optical signal, the frequency characteristics of trans-impedance can be flattened. As a result, deterioration in output characteristics due to distortion can be reduced.

In addition, the resistance value of the variable resistor 11b is configured to be set in association with the resistance value of the variable resistor 11a. Therefore, in the dynamic range of an input optical signal, the effect of peaking due to the inductor 9 can be further stabilized. As a result, in the dynamic range of an input optical signal, deterioration in output characteristics can be further reduced.

In addition, since the resistance value of the variable resistor 11b is configured to be set to a value larger than the resistance value of the variable resistor 11a, the effect of peaking due to the inductor 9 can be prevented from being degraded more than necessary. As a result, in the dynamic range of an optical signal, deterioration in output characteristics can be reduced.

Moreover, since the same bias voltages Vref are applied to the two variable resistors 11a and 11b, bias conditions of the two variable resistors 11a and 11b can coincide with each other, and the variable resistors 11a and 11b are easily controlled by eliminating the influence of a relative voltage difference due to unevenness or fluctuation of each of a first bias voltage and a second bias voltage.

Next, an effect of flattening frequency characteristics of trans-impedance in the present embodiment will be specifically described in comparison with a comparative example.

Figure 15:
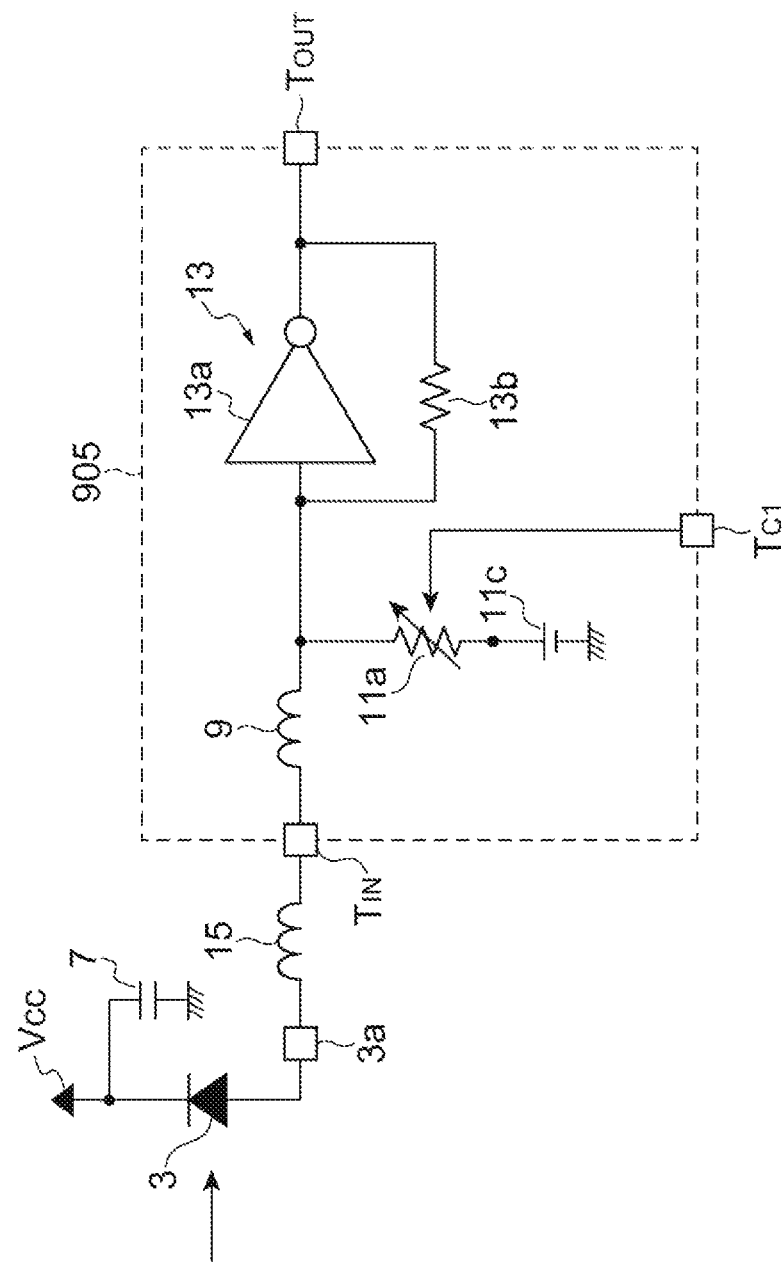
FIG. 15 is a view illustrating a schematic configuration of an optical receiver module according to a comparative example.
Figure 16A:
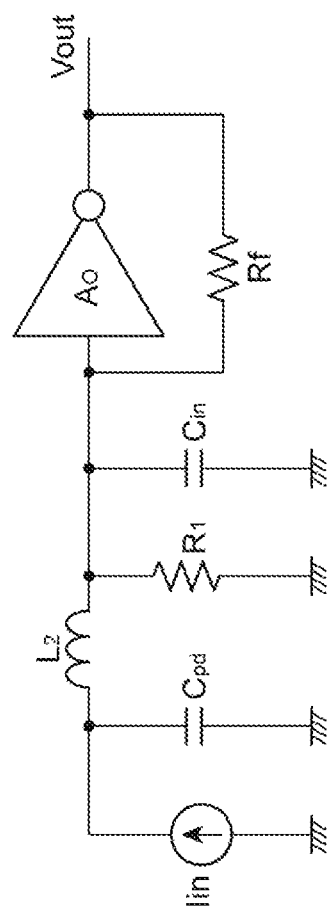
FIG. 16A is an equivalent circuit diagram of a circuit including an optical receiver circuit 905 according to the comparative example.
Figure 16B:
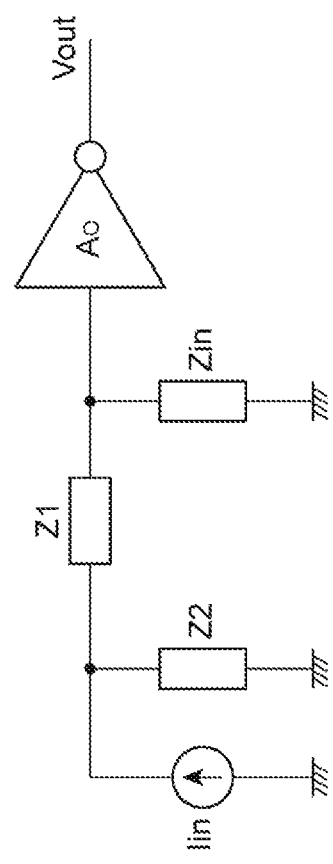
FIG. 16B is an equivalent circuit diagram of another circuit including the optical receiver circuit 905 according to the comparative example.

FIG. 15 illustrates a schematic configuration of an optical receiver circuit 905 according to the comparative example. This optical receiver circuit 905 differs from the optical receiver circuit 5 in that the variable resistor 11a is connected to only a terminal of the inductor 9 on the trans-impedance amplifier 13 side and the variable resistor 11b connected to a terminal of the inductor 9 on the input terminal $T_{IN}$ side is not provided. Since the variable resistor 11b is not provided, only the variable resistor 11a is connected to the bias generation circuit 11c. FIGS. 16A and 16B illustrate equivalent circuits related to the high-frequency characteristics of a circuit including the photosensor 3 and the optical receiver circuit 905. In FIG. 16A, Iin indicates a current (photo-current) generated by the photosensor 3, $A_O$ indicates an amplification factor (voltage gain) of the inverting amplifier 13a, $C_{in}$ indicates an input capacitance of the inverting amplifier 13a, $C_{pd}$ indicates a parasitic capacitance of the photosensor 3, Rf indicates a resistance value of the feedback resistor 13b, and Vout indicates a voltage signal output by the optical receiver circuit 905. In addition, since the inductance $L_1$ of the wire 15 illustrated in FIG. 15 is smaller than the inductance $L_2$, it is disregarded. It is possible to disregard characteristics other than those depending on the input capacitance $C_{in}$ of the frequency characteristics of the inverting amplifier 13a. In contrast to the equivalent circuit in FIG. 16A, FIG. 16B is rewritten such that the capacitance $C_{pd}$ is indicated as an impedance Z2, the inductance $L_2$ is indicated as an impedance Z1, and the input impedance of the inverting amplifier 13a viewed from the inductor 9 is indicated as an impedance Zin.

The respective impedances Z1, Z2, and Zin are expressed by the following Expressions (1) to (4).

$$Z_1 = j\omega L_2 \qquad (1)$$

$$Z_2 = \frac{1}{j\omega C_{pd}} \qquad (2)$$

$$Z_{in} = \frac{R_{in}}{1 + j\omega C_{in} R_{in}} \qquad (3)$$

$$R_{in} \cong \frac{\frac{R_f}{A_O} R_1}{\frac{R_f}{A_O} + R_1} \qquad (4)$$

Moreover, a trans-impedance $Z_t$ which is a current-voltage gain in FIG. 16B and an amplitude thereof are respectively expressed by the following Expression (5) and the following Expression (6).

$$Z_t = \frac{V_{OUT}}{I_{IN}} = \frac{Z_2 Z_{in} A_O}{Z_2 + (Z_1 + Z_{in})} = \qquad (5)$$
$$\frac{R_{in} A_O}{1 + R_{in} j\omega(C_{in} + C_{pd}) + j\omega L_2 (j\omega C_{pd})(j\omega C_{in} R_{in} + 1)} =$$
$$\frac{R_{in} A_O}{1 - \omega^2 L_2 C_{pd} + j\omega R_{in}(C_{in} + C_{pd} - \omega^2 L_2 C_{in} C_{pd})}$$

$$|Z_t| = \frac{|R_{in} A_O|}{\sqrt{(1 - \omega^2 L_2 C_{pd})^2 + \omega^2 R_{in}^2 (C_{in} + C_{pd} - \omega^2 L_2 C_{in} C_{pd})^2}} \qquad (6)$$

Here, the amplitude of the trans-impedance $Z_t$ is expressed by the following Expression (7) when $L_2$=0, that is, when there is no inductor 9 for expanding a frequency band.

$$|Z_t| = \frac{|R_{in} A_O|}{\sqrt{1 + \omega^2 (C_{pd} + C_{in})^2 R_{in}^2}} \qquad (7)$$

Figure 17:
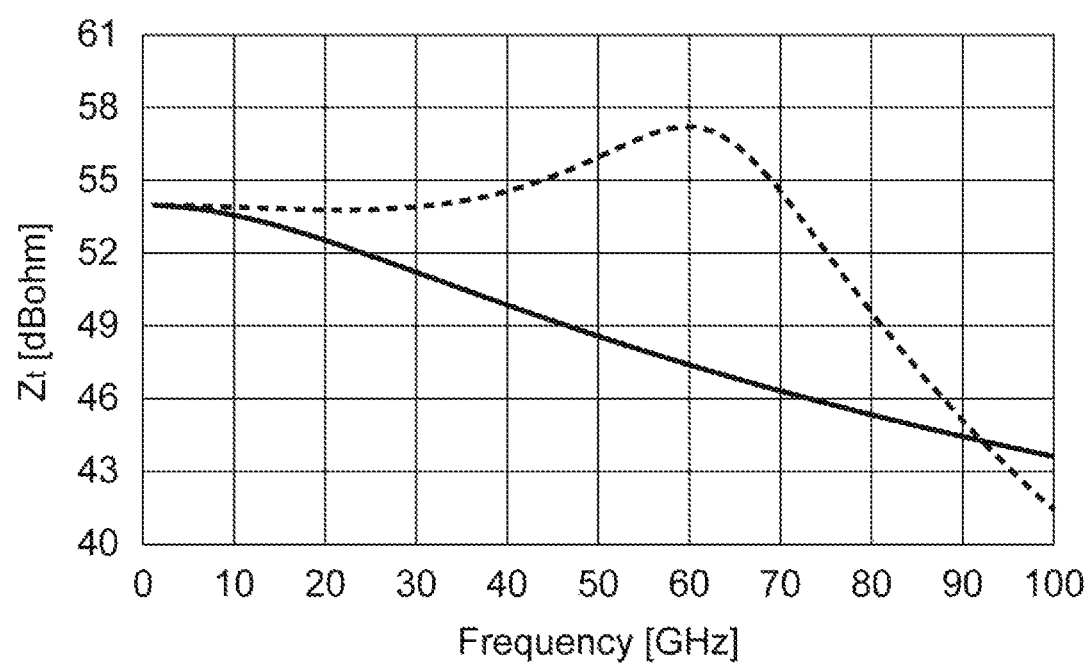
FIG. 17 is a graph showing high-frequency characteristics of the trans-impedance $Z_t$ in the comparative example.

FIG. 17 illustrates calculation results of the high-frequency characteristics (frequency characteristics) of the trans-impedance $Z_t$ in the comparative example. Here, calculation is performed with representative values such as $C_{pd}$=50 fF, $C_{in}$=50 fF, Rf=500 ohm, $A_O$=10, and $L_2$=200 pH. In addition, an operation in a case where an input optical signal is comparatively small is postulated, and $R_1$=1,000 ohm is assumed. The solid line indicated in FIG. 17 indicates characteristics when $L_2$=0 pH for comparison, and the dotted line indicates characteristics when $L_2$=200 pH.

From these results, it can be seen that a frequency band of 3 dB, which is a frequency band in which the trans-impedance $Z_t$ is lowered from a value at frequency 0 GHz by 3 dB, has increased from 32 GHz to 77 GHz due to the peaking effect of the inductor 9. In the case of $L_2$=200 pH, a peak of approximately +3 dB is generated around 60 GHz. However, it can be seen that this peak has been reduced due to a frequency loss of circuits in a rear stage of the trans-impedance amplifier 13 and a high-frequency loss of a line of an output portion of the optical receiver module. Therefore, a peak within a range of 2 to 4 dB is preferable for the entire optical receiver module including the circuits in the rear stage. When the high-frequency characteristics have a peak of 4 dB or higher, there is concern that frequency flatness of the entire optical receiver module may be worsened.

Figure 18:
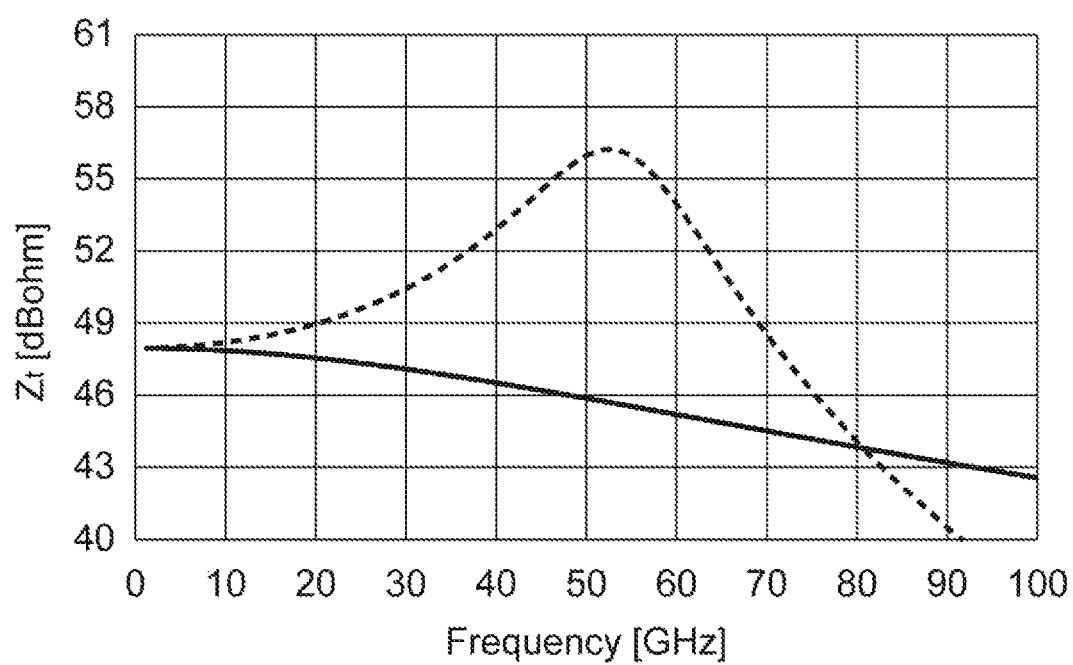
FIG. 18 is another graph showing high-frequency characteristics of the trans-impedance $Z_t$ in the comparative example.

FIG. 18 illustrates calculation results of the high-frequency characteristics of the trans-impedance $Z_t$ in a case where the value of $R_1$ is lowered to 50 ohm in the comparative example. In these results, an operation in a case where an input optical signal is comparatively large is postulated. In the calculation results, the solid line indicates the case of $L_2$=0 pH, and the dotted line indicates the case of $L_2$=200 pH.

From these results, the trans-impedance $Z_t$ around 1 GHz is lowered by 6 dB compared to the results in FIG. 17. However, in the case of $L_2$=200 pH, the peak around 53 GHz has become larger than the value around a frequency 1 GHz by approximately 8 dB. As a reason therefor, it is conceivable that the effect of peaking due to the inductor 9 has relatively increased due to a drop of an input resistance $R_{in}$. As described above, a peak of the frequency characteristics exceeding 4 dB can worsen the frequency flatness of the optical receiver module and cause the output characteristics of the entire optical receiver module to deteriorate. On the other hand, when the value of the inductance $L_2$ is lowered, the height of the peak can be reduced. However, in such a case, in a case where an input optical signal is comparatively large (in the case of $R_1$=1,000 ohm), the peak falls below a range of 2 to 4 dB for a preferable value. Therefore, the peak when an optical signal is comparatively large is required to be curbed without lowering the value of the inductance $L_2$ in order to cover a wider dynamic range of the intensity of an optical signal.

Figure 5A:
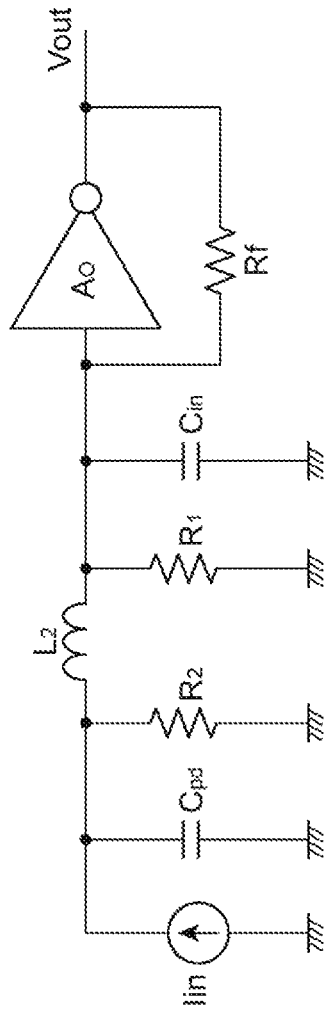
FIG. 5A is an equivalent circuit diagram of a circuit including the optical receiver circuit 5 according to the embodiment.
Figure 5B:
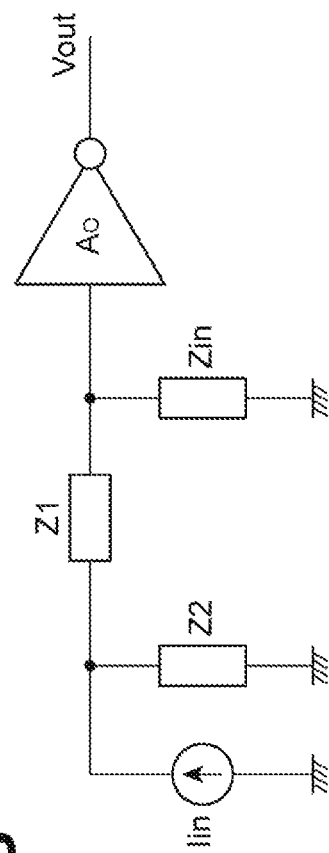
FIG. 5B is an equivalent circuit diagram of another circuit including the optical receiver circuit 5 according to the embodiment.

FIGS. 5A and 5B illustrate equivalent circuits related to the high-frequency characteristics of a circuit including the photosensor 3 and the optical receiver circuit 5 of the present embodiment. In contrast to the equivalent circuit in FIG. 5A, FIG. 5B is rewritten such that the capacitance $C_{pd}$ and the resistor $R_2$ are indicated as the impedance Z2, the inductance $L_2$ is indicated as the impedance Z1, and the input impedance of the inverting amplifier 13a is indicated as the impedance Zin.

The respective impedances Z1, Z2, and Zin are expressed by the following Expressions (8) to (11).

$$Z_1 = j\omega L_2 \qquad (8)$$

-continued $$Z_2 = \frac{R_2}{1 + j\omega C_{pd} R_2} \quad (9)$$

$$Z_{in} = \frac{R_{in}}{1 + j\omega C_i R_{in}} \quad (10)$$

$$R_{in} \cong \frac{\frac{R_f}{A_O} R_1}{\frac{R_f}{A_O} + R_1} \quad (11)$$

Moreover, the trans-impedance $Z_t$ which is a current-voltage gain in FIG. 5B and an amplitude thereof are respectively expressed by the following Expression (12) and the following Expression (13).

$$Z_t = \frac{V_{OUT}}{I_{IN}} = \frac{Z_2 Z_{in} A_O}{Z_2 + (Z_1 + Z_{in})} = \quad (12)$$

$$\frac{R_2 R_{in} A_O}{(1 + j\omega C_{in} R_{in}) R_2 + j\omega L_2 (1 + j\omega C_{pd} R_2)(1 + j\omega C_{in} R_{in}) +} = $$
$$(1 + j\omega C_{pd} R_2) R_{in}$$

$$\frac{R_2 R_{in} A_O}{R_2 + R_{in} - \omega^2 L_2 (C_{in} R_{in} + C_{pd} R_2) +}$$
$$j\omega (C_{in} R_{in} R_2 + L_2 (1 - \omega^2 L_2 C_{in} C_{pd} R_{in} R_2) + C_{pd} R_{in} R_2)$$

$$|Z_t| = \frac{|R_2 R_{in} A_O|}{\sqrt{(R_2 + R_{in} - \omega^2 L_2 (C_{in} R_{in} + C_{pd} R_2))^2 + }} \quad (13)$$
$$\sqrt{\omega^2 (C_{in} R_{in} R_2 + L_2 (1 - \omega^2 C_{in} C_{pd} R_{in} R_2) + C_{pd} R_{in} R_2)^2}$$

Figure 6:
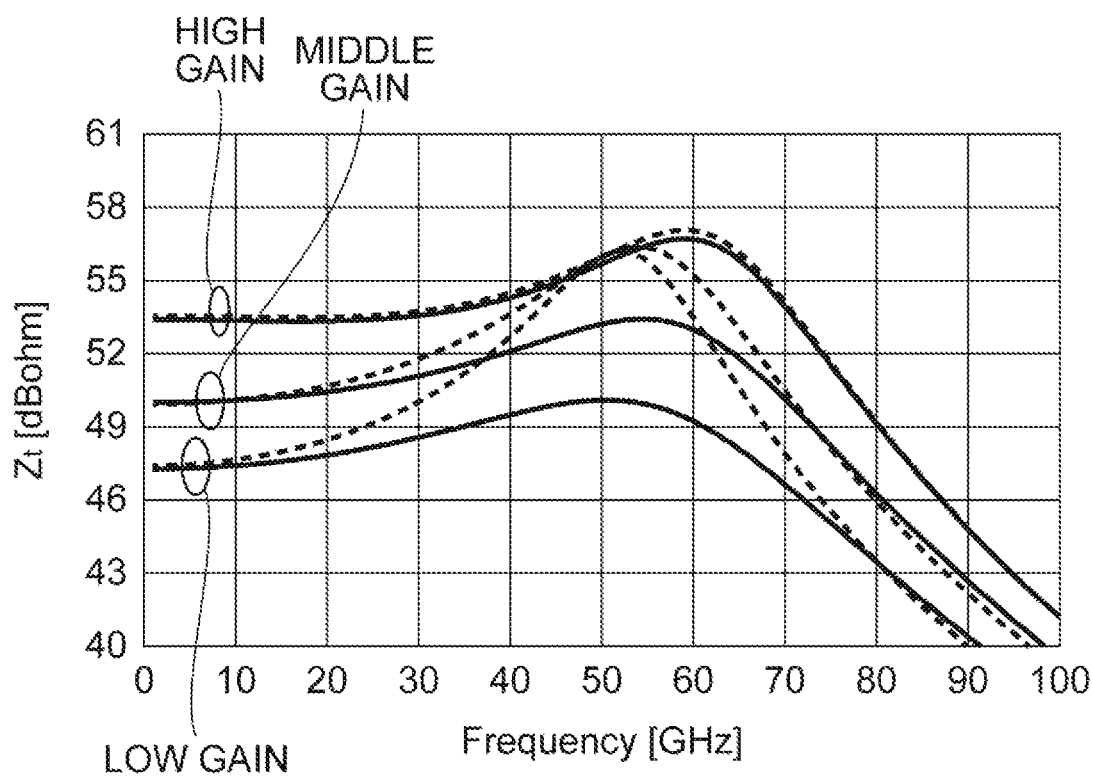
FIG. 6 is a graph showing high-frequency characteristics of a trans-impedance $Z_t$ in the embodiment.

FIG. 6 illustrates calculation results of the high-frequency characteristics of the trans-impedance $Z_t$ in the present embodiment. Here, similar to the results in FIG. 17, calculation is performed with representative values such as $C_{pd}$=50 fF, $C_{in}$=50 fF, Rf=500 ohm, $A_O$=10, and $L_2$=200 pH. In addition, the ratio between $R_1$ and $R_2$ is set to 1:2.5, an operation in a case where an input optical signal is comparatively small is postulated, and $R_1$=1,000 ohm and $R_2$=2,500 ohm are assumed (in the case of a high gain). Meanwhile, an operation in a case where an input optical signal is comparatively large is postulated, and $R_1$=60 ohm and $R_2$=150 ohm are assumed (in the case of a low gain). In addition, a case where an optical signal has an intermediate magnitude is postulated, and $R_1$=120 ohm and $R_2$=300 ohm are assumed (in the case of an middle gain between a low gain and a high gain). The solid line indicated in FIG. 6 indicates frequency characteristics of the present embodiment, and the dotted line indicates frequency characteristics in the comparative example illustrated in FIG. 15. In the comparative example, $R_1$=1,000 ohm is set for a high gain, $R_1$=44 ohm is set for a low gain, and $R_1$=84 ohm is set for an middle gain.

From these results, in the comparative example as described above, a significant peak of approximately 8 dB appears at the time of a low-gain operation. However, in the present embodiment, a peak at the time of a low-gain operation is curbed to approximately 2 dB. In addition, in the present embodiment, a peak having a preferable height of approximately 3 dB is realized even at the time of a high-gain operation. Moreover, in the present embodiment, a peak having a preferable height of approximately 3 dB is maintained even at the time of an middle-gain operation. In this manner, the peak height in a high-frequency band can be maintained at a preferable value at the time of any of a high-gain operation, an middle-gain operation, and a low-gain operation by using the configuration of the present embodiment.

Hereinabove, principles of the present invention have been illustrated and described with a preferable embodiment. However, those skilled in the art will be able to appreciate that the present invention can be changed in disposition and details without departing from such principles. The present invention is not limited to particular configurations disclosed in the present embodiment. Therefore, rights are claimed on all the modifications and changes derived from the claims and the scope of the spirit thereof.

Figure 7:
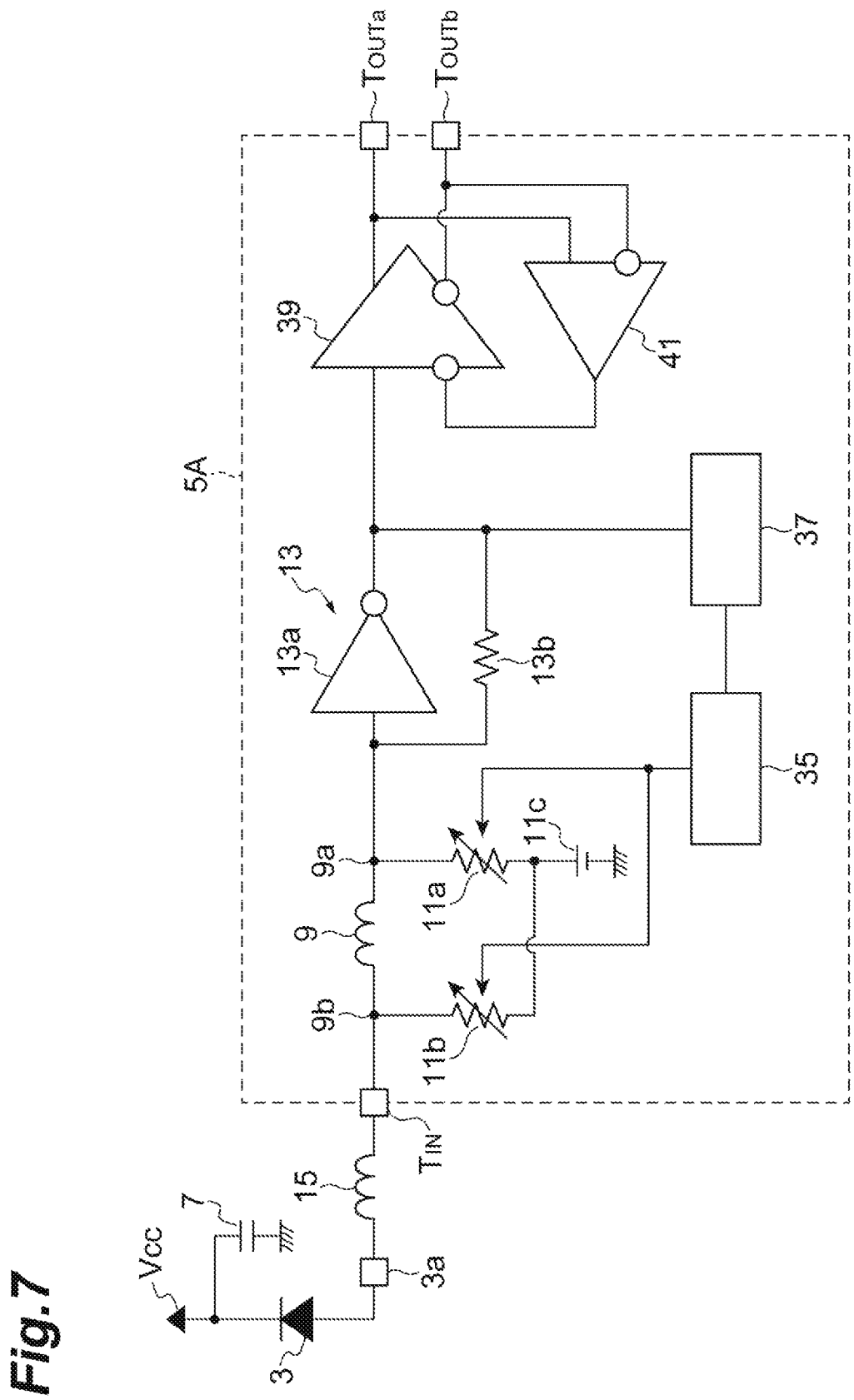
FIG. 7 is a circuit diagram illustrating a configuration of an optical receiver circuit 5A according to a first modification example of the present disclosure.

FIG. 7 is a circuit diagram illustrating a configuration of an optical receiver circuit 5A according to a first modification example of the present disclosure. In the optical receiver circuit 5A, a control circuit 35 and an amplitude detection circuit 37 configured to detect an amplitude of an output electrical signal (voltage signal) of the trans-impedance amplifier 13 and to automatically adjust the gain in accordance with the detection results, a differential amplifier 39 converting an output signal of the trans-impedance amplifier 13 into two differential signals, and an offset adjustment amplifier 41 adjusting an offset between the two differential signals are added. The amplitude detection circuit 37 detects the amplitude of an output electrical signal of the trans-impedance amplifier 13, and the control circuit 35 generates a control voltage in accordance with the amplitude thereof and applies the control voltage to the variable resistors 11a and 11b. Here, an output electrical signal shifts between a voltage value (peak value) of Level "1" and a voltage value (bottom value) of Level "0" about an average voltage. The amplitude thereof corresponds to a voltage difference between the peak value and the bottom value. The average voltage of an output electrical signal is substantially constant and the amplitude increases or decreases as an optical signal becomes strong or weak. According to such a modification example, the resistance values of the variable resistors 11a and 11b can be automatically controlled in accordance with an output amplitude, and therefore a trans-impedance amplifier having a function of automatic gain variable control can be realized. Here, in this first modification example, the amplitude detection circuit 37 detects the amplitude of an output electrical signal of the trans-impedance amplifier 13. However, the amplitude of an output of the differential amplifier 39 in the rear stage may be detected, or the amplitude of an output inside the differential amplifier 39 may be detected.

FIGS. 8 to 11 are graphs showing specific examples of automatic gain variable control in the first modification example.

Figure 8:
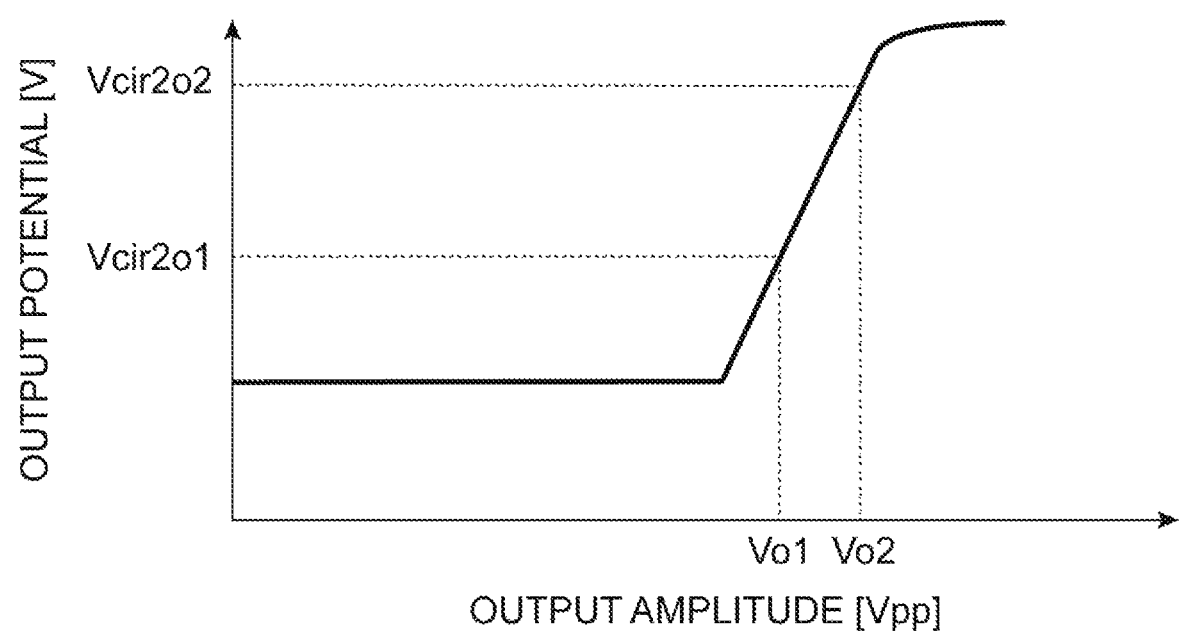
FIG. 8 is a graph showing a specific example of automatic gain variable control in the first modification example.

FIG. 8 shows a relationship between an output amplitude of the trans-impedance amplifier 13 and an output potential of the control circuit 35. In this example, the output amplitude of the trans-impedance amplifier 13 is controlled such that it is within a range between a value Vo1 and a value Vo1. The output potential of the control circuit 35 is automatically adjusted within a range between Vcir2o2 that is a potential at which the resistance values of the variable resistors 11a and 11b starts to be lowered and Vcir2o1 that is a potential at which the resistance values of the variable resistors 11a and 11b becomes the lowest value. The control circuit 35 raises the output potential such that it rises to Vcir2o1 when the output amplitude rises to a value slightly lower than Vo1, in accordance with the output amplitude of the trans-impedance amplifier 13 detected by the amplitude detection circuit 37. Moreover, when the output amplitude rises, the control circuit 35 raises the output potential to Vcir2o2. In an ordinary operation, the output potential is operated within a range of up to Vcir2o2. However, when the output amplitude rises up to Vo2 or higher, the output potential of the control circuit 35 becomes saturated.

Figure 9:
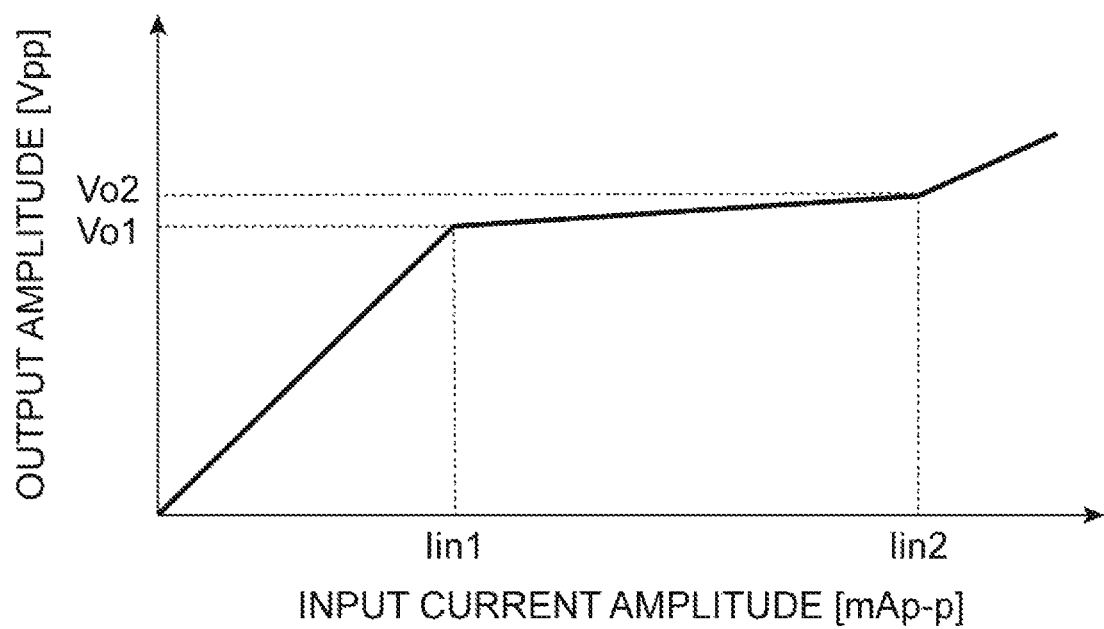
FIG. 9 is a graph showing another specific example of automatic gain variable control in the first modification example.
Figure 10:
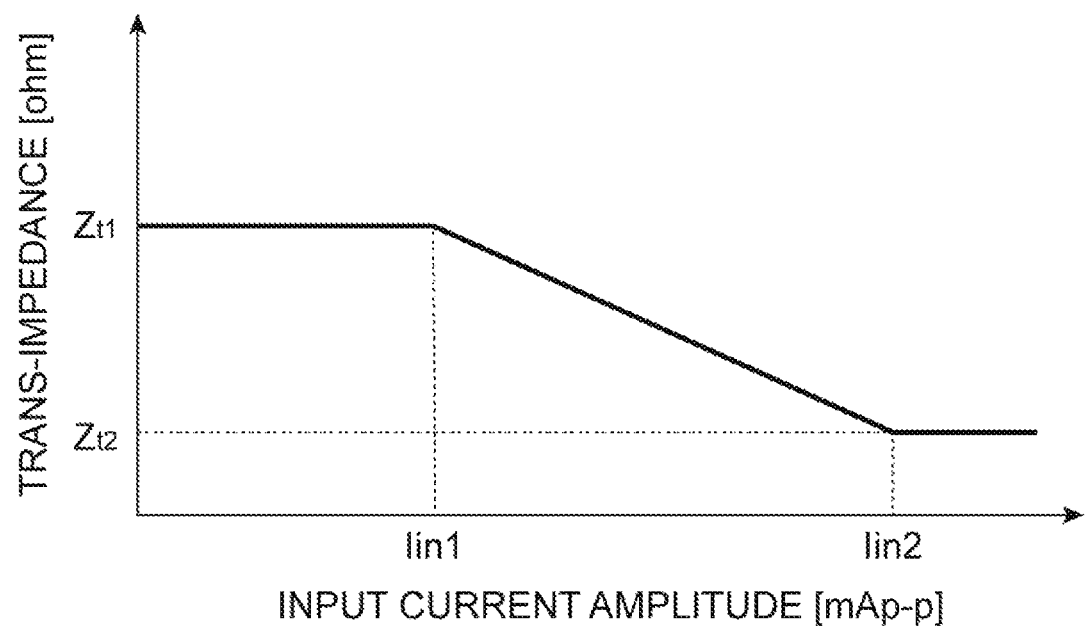
FIG. 10 is a graph showing another specific example of automatic gain variable control in the first modification example.
Figure 11:
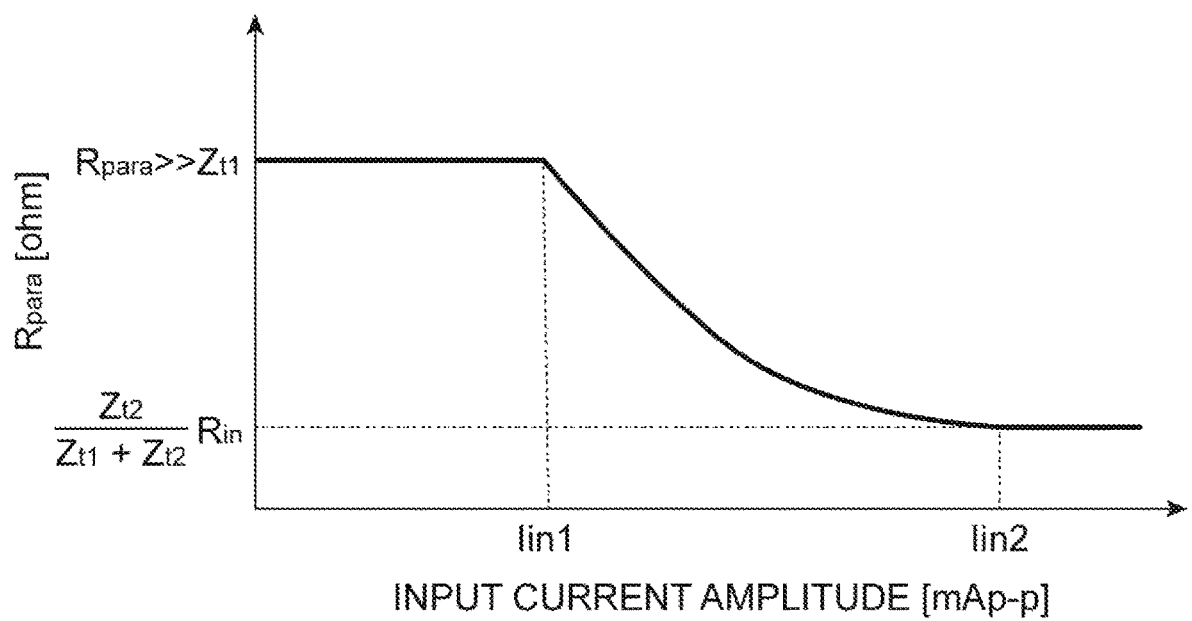
FIG. 11 is a graph showing another specific example of automatic gain variable control in the first modification example.

FIG. 9 shows a relationship between an input current amplitude and an output amplitude of the trans-impedance amplifier 13. FIG. 10 shows a relationship between an input current amplitude and the trans-impedance $Z_t$. FIG. 11 shows a relationship between an input current amplitude and a parallel resistance $R_{para}$ of the variable resistors 11a and 11b. The amplitude detection circuit 37 detects an output amplitude, generates potential information or current information, and inputs the information to the control circuit 35. In contrast, the control circuit 35 lowers the resistance values $R_1$ and $R_2$ of the variable resistors 11a and 11b in a state where the output amplitude reaches Vo1. A control target value of the output amplitude of the control circuit 35 is Vo1, and a loop gain of a control loop is limited. Therefore, as a result, the output amplitude is controlled such that it has a value slightly higher than Vo1. When the input current amplitude reaches Iin2, the trans-impedance is controlled such that it has a lowest gain $Z_{t2}$. If the input current amplitude is Iin2 or higher, the output amplitude rises again. Therefore, generally, design is performed such that the usage range of the optical receiver circuit has an input current amplitude of Iin2 or lower. The parallel resistance value $R_{para}$ of the variable resistors 11a and 11b is applied by the following Expression (14).

$$R_{para} = \frac{R_1 R_2}{R_1 + R_2} \quad (14)$$

The value of the trans-impedance $Z_t$ including a circuit for automatic gain variable control is expressed by the following Expression (15).

$$Z_t = \frac{R_{para}}{R_{para} + R_{in}} Z_{t1} \quad (15)$$

The control circuit 35 controls the parallel resistance value $R_{para}$ in accordance with the following Expression (16) based on a trans-impedance $Z_{t1}$ of a single body of the trans-impedance amplifier 13 and a target gain $Z_t$. FIG. 11 illustrates a state of a change in the parallel resistance value $R_{para}$ controlled by the control circuit 35.

$$R_{para} = \frac{Z_t}{Z_{t1} + Z_t} R_{in} \quad (16)$$

Figure 12:
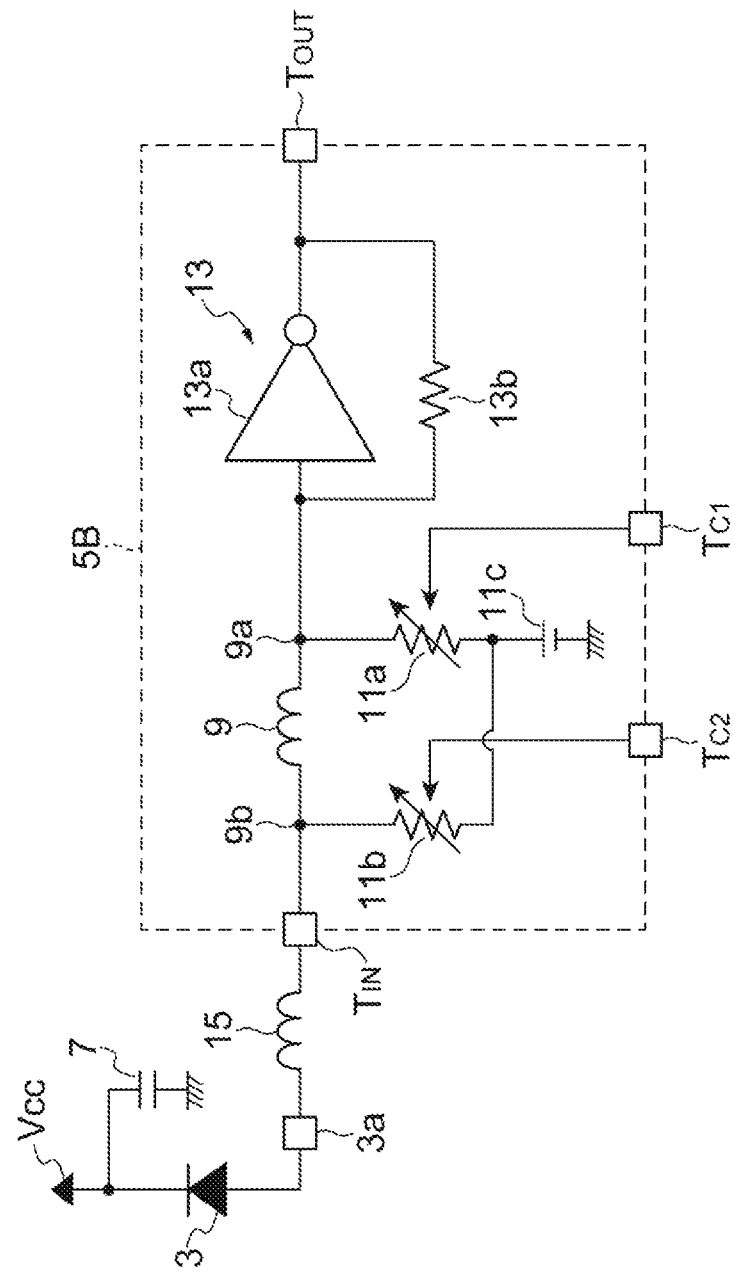
FIG. 12 is a circuit diagram illustrating a configuration of an optical receiver circuit 5B according to a second modification example of the present disclosure.

FIG. 12 is a circuit diagram illustrating a configuration of an optical receiver circuit 5B according to a second modification example of the present disclosure. The optical receiver circuit 5B differs from the optical receiver circuit 5 in a configuration in which two control terminals $T_{C1}$ and $T_{C2}$ are provided and different control voltages can be applied to the two variable resistors 11a and 11b from these control terminals $T_{C1}$ and $T_{C2}$. Accordingly, the resistance value of the variable resistor 11a and the resistance value of the variable resistor 11b can be controlled independently, and the peak amount in the frequency characteristics at higher frequencies can be controlled independently. Therefore, even if the peak amount at the higher frequencies changes due to variation in manufacturing of inductors, variable resistors, and the like; variations in manufacturing of photosensors; and the like, flatness can be ameliorated by independently adjusting the control voltage applied to the variable resistor 11b.

Figure 13:
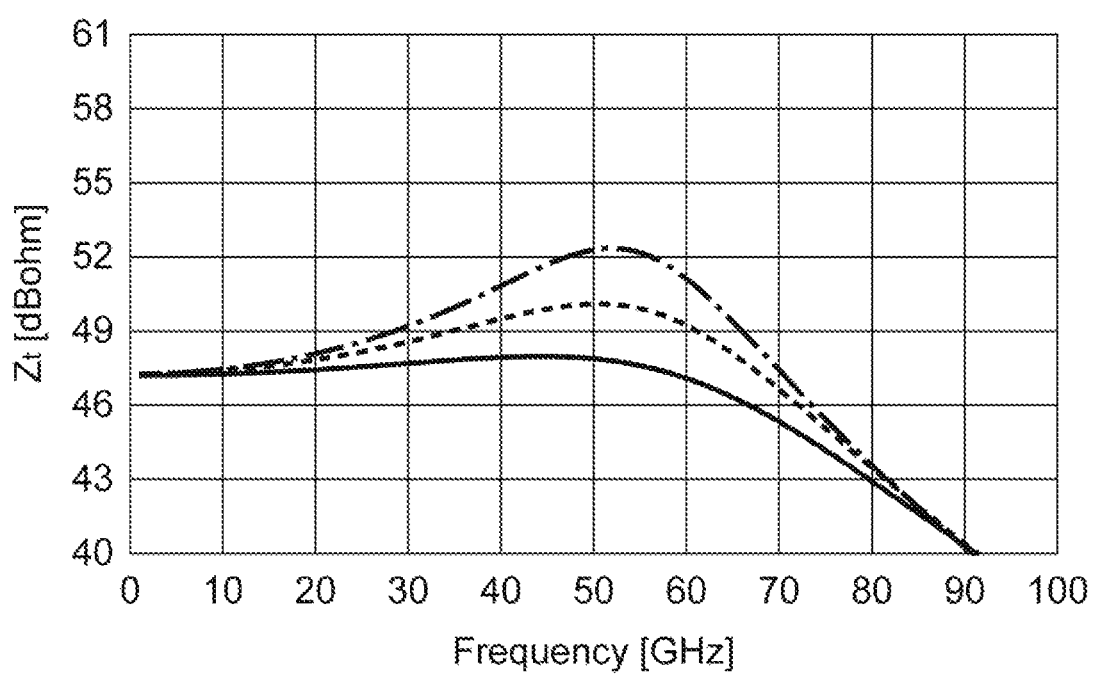
FIG. 13 is a graph showing high-frequency characteristics of the trans-impedance $Z_t$ in the second modification example.

FIG. 13 illustrates a change in frequency characteristics of the trans-impedance $Z_t$ in a case where the ratio between the resistance value $R_1$ and the resistance value $R_2$ is varied in the second modification example. Here, calculation is performed with representative values such as $C_{pd}=50$ fF, $C_{in}=50$ fF, Rf=500 ohm, $A_O=10$, and $L_2=200$ pH. The solid line indicates calculation results of characteristics when $R_1:R_2=1:0.89$ with $R_1=90$ ohm and $R_2=80$ ohm, the dotted line indicates calculation results of characteristics when $R_1:R_2=1:2.5$ with $R_1=60$ ohm and $R_2=150$ ohm. The one-dot chain line indicates calculation results of characteristics when $R_1:R_2=1:6$ with $R_1=50$ ohm and $R_2=300$ ohm. In this manner, the peak of the frequency characteristics changes within a range of 1 dB to 5 dB. Due to the configuration of the second modification example, the height of the peak can be adjusted, and it is possible to select preferable heights of the peak with respect to the frequency characteristics of the photosensor and the circuits in the rear stage.

Figure 14:
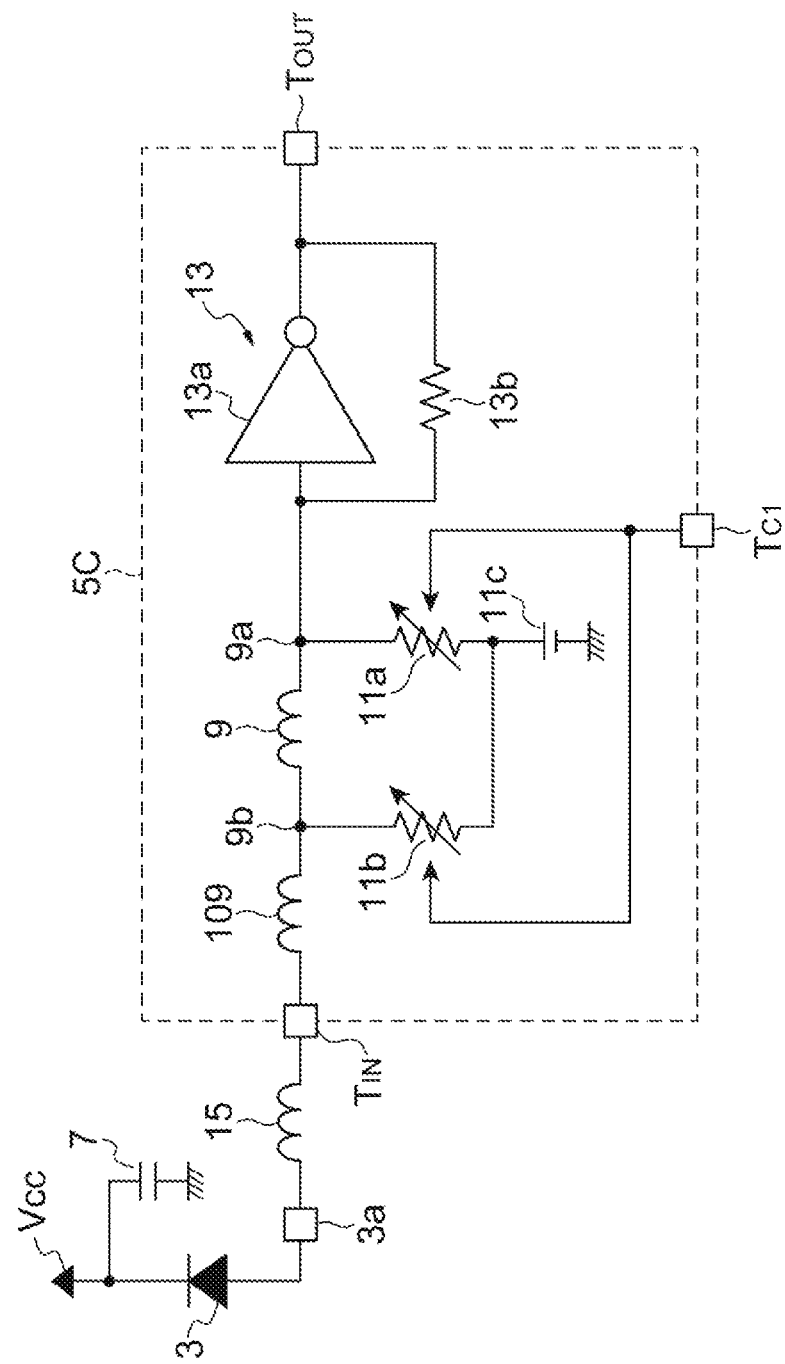
FIG. 14 is a circuit diagram illustrating a configuration of an optical receiver circuit 5C according to a third modification example of the present disclosure.

FIG. 14 is a circuit diagram illustrating a configuration of an optical receiver circuit 5C according to a third modification example of the present disclosure. The optical receiver circuit 5C differs from the optical receiver circuit 5 in having another inductor 109 which is inserted between the one terminal 9b of the inductor 9 and the input terminal $T_{IN}$. According to such a configuration as well, flattening of the frequency characteristics of trans-impedance is realized.

What is claimed is:

1. An optical receiver circuit comprising:
   an input terminal receiving a current signal from an external photodetector;
   a trans-impedance amplifier configured to convert the current signal received through an input thereof into a voltage signal;
   an inductor having one end electrically connected to the input terminal and another end electrically connected to the input of the trans-impedance amplifier;
   a first variable resistor having a first end electrically connected to the other end of the inductor, a second end receiving an applied bias voltage, and a third end receiving a first control signal,
   wherein the first variable resistor is configured to vary a first resistance value between the first end and the second end thereof in accordance with the first control signal; and
   a second variable resistor having a first end electrically connected to the one end of the inductor, a second end receiving an applied bias voltage, and a third end receiving a second control signal,
   wherein the second variable resistor is configured to vary a second resistance value between the first end of the second variable resistor and the second end of the second variable resistor in accordance with the second control signal.

2. The optical receiver circuit according to claim 1, wherein the first control signal and the second control signal are set partially based on at least an amplitude of the voltage signal.

3. The optical receiver circuit according to claim 2, wherein the second resistance value is set to a value larger than the first resistance value.

4. The optical receiver circuit according to claim 3,
wherein the first resistance value and the second resistance value decrease when the amplitude of the voltage signal increases.

5. The optical receiver circuit according to claim 1,
wherein the first variable resistor and the second variable resistor include a transistor.

6. The optical receiver circuit according to claim 1,
wherein the first control signal and the second control signal are able to be set independently.

7. The optical receiver circuit according to claim 5,
wherein the first variable resistor and the second variable resistor are first and second field effect transistors respectively,
wherein the first control signal is applied to a gate of the first field effect transistor,
wherein a drain of the first field effect transistor is connected to the other end of the inductor,
wherein the second control signal is applied to a gate of the second field effect transistor,
wherein a drain of the second field effect transistor is connected to the one end of the inductor, and
wherein the bias voltage is applied to sources of the first and second field effect transistors.

8. The optical receiver circuit according to claim 7,
wherein the bias voltage is set to a same value as a DC voltage on an input side of the trans-impedance amplifier.

9. The optical receiver circuit according to claim 1, further comprising:
a detector configured to detect an output amplitude of the trans-impedance amplifier; and
a control circuit configured to raise potentials of the first control signal and the second control signal within a preset range for lowering the first resistance value of the first variable resistor and the second resistance value of the second variable resistor when the output amplitude detected by the detector rises.

* * * * *